(12) United States Patent
Everett

(10) Patent No.: US 7,282,144 B2
(45) Date of Patent: Oct. 16, 2007

(54) SEMI-SUBMERSIBLE FLOATING DECANTERS AND METHODS OF USING SAME

(75) Inventor: Jose Patrick Everett, Houston, TX (US)

(73) Assignee: Ashbrook Simon-Hartley Operations, LP, Houston, TX (US)

( * ) Notice: Subject to any disclaimer, the term of this patent is extended or adjusted under 35 U.S.C. 154(b) by 365 days.

(21) Appl. No.: 10/787,626

(22) Filed: Feb. 26, 2004

(65) Prior Publication Data
US 2005/0189300 A1  Sep. 1, 2005

(51) Int. Cl.
B01D 21/24  (2006.01)

(52) U.S. Cl. .............. 210/221.2; 210/242.1; 210/242.2; 210/122; 210/123; 210/523; 210/540

(58) Field of Classification Search ......... 210/221.2, 210/242.1, 242.2, 122, 123, 523, 540
See application file for complete search history.

(56) References Cited

U.S. PATENT DOCUMENTS

| | | | |
|---|---|---|---|
| 3,534,859 A | * | 10/1970 | Amero et al. ......... 210/242.3 |
| 4,582,609 A | * | 4/1986 | Hunter et al. ......... 210/747 |
| 4,596,658 A | | 6/1986 | Mandt |
| 4,695,376 A | | 9/1987 | Astrom |
| 4,883,602 A | * | 11/1989 | Anderson ......... 210/776 |
| 5,104,528 A | | 4/1992 | Christie |
| 6,277,273 B1 | | 8/2001 | Gore |

OTHER PUBLICATIONS

Ashbrook Corporation, "SBR plus" brochure, date unknown but prior to Feb. 26, 2004, pp. 1-2.

* cited by examiner

*Primary Examiner*—Thomas M. Lithgow
(74) *Attorney, Agent, or Firm*—Pramudji Wendt & Tran, LLP; Jeffrey L. Wendt

(57) ABSTRACT

Semi-submersible floating decanters and methods of use are provided. The decanters are moveable between a non-decant position and a decant position, and include a float forming an internal cavity, the float having a central annulus, a weir having an inlet opening and positioned within the center of the annulus and fixedly connected to the float forming a passage between the float and the weir, and a discharge conduit connected to the weir for discharging a supernatant fluid therefrom. A depth adjusting mechanism is provided for moving the decanter within a liquid between a non-decant position wherein the inlet opening is above the surface of the liquid and a decant position wherein the inlet opening is positioned within the supernatant to allow the supernatant to be withdrawn, the depth adjusting mechanism including a pumping mechanism for moving a fluid relative to the internal cavity.

13 Claims, 3 Drawing Sheets

SEMI-SUBMERSIBLE FLOATING DECANTERS AND METHODS OF USING SAME

BACKGROUND INFORMATION

1. Technical Field

The present invention relates in general to waste material treatment and more particularly to a decanting apparatus and methods for removal of a supernatant from a vessel, such as a sequential batch reactor.

2. Background Art

In a sequencing batch reactor process of wastewater treatment a reactor is operated in a batch treatment mode involving a fill phase, aerate or react phase, a settle phase and a decant phase. During the aerate phase the wastewater influent is mixed and aerated. In the settle phase the suspended solids are allowed to settle typically forming a scum surface, a layer of supernatant, and a sludge blanket. In the decant phase the relatively clear supernatant is removed without drawing solids from the scum layer or sludge blanket. When in a non-decant phase it is necessary to prevent accumulation of suspended solids in the decanter that will contaminate the supernatant that is drawn in to the weir in the decant phase.

The quality of the withdrawn supernatant is affected by the design of the decanter. If during the decant phase the decanter draws in floating solids form the scum layer or material form the sludge blanket the quality of the discharged supernatant will be unacceptable as a discharge effluent. Further, if suspended solids enter the weir of the decanter during the non-decant phases of the process the solids will be discharged with the supernatant during the decant phase adversely affecting the quality of the discharged supernatant.

The prior art decanters are generally classified as fixed decanters or floating decanters. An example of a fixed type decanter is disclosed in U.S. Pat. No. 4,596,658. The fixed decanter remains under the surface of the mixed liquor wherein suspended solids may settle in the weir. It is attempted to prevent solids form settling in the weir by maintaining the solids in a laminar flow inlet. However, it is common for solids to settle in the decanter weir and be discharged with the decanted supernatant. The fixed decanter design has numerous other drawbacks. For example, the fixed decanter design requires expensive installation and precise management of the sequencing batch reactor process to work properly.

Floating decanters attempt to prevent solids or scum from entering the weir and the stream of decanted supernatant by use of a float. An example of a floating type decanter is disclosed in U.S. Pat, No. 4,695,376. The floating decanter of the 376 patent attempts to prevent suspended solids from entering the weir during the non-decant phases by sealing the weir against the float. After the settle phase, a linear actuator is utilized to lower the weir for the underside of the float thereby enabling the weir to decant the supernatant.

One drawback of the floating decanter disclosed in the 376 patent is that during the non-decant phases the suspended solids enter and accumulate in the weir due to the inability of the device to form an absolute seal. The accumulation of solids in the decanter during the non-decant phases contaminates the supernatant discharged during the decant phase. This contamination of the supernatant results in the rejection of the discharged effluent, thus requiring flushing of the lines before resuming withdrawal of the supernatant. This floating decanter further includes guide-posts or moorings, extending from the bottom of the reactor, to maintain the floating decanter in a selected location and stable in the fluid.

Another example of a floating type decanter is disclosed in U.S. Pat. No. 5,104,528. This floating decanter includes a weir disposed within the annulus of a float. A linear actuator is connected between the weir and the float. During the non-decant phases the weir is maintained in a position above the surface of the liquor. After the settle phase is completed the linear actuator is activated to lower the weir to a position below the liquid surface. The decant phase is ended by raising the weir to a position above the surface of the liquid. This prior art floating decanter includes guides posts extending from the bottom of the reactor to maintain the floating decanter in a set location and maintain stability of the decanter in the liquid.

It is a desire to provide a semi-submersible floating decanter that overcomes the drawbacks of the prior art decanters. It is a further desire to provide a semi-submersible floating decanter that is able to deliver the supernatant without contamination with solids, is simple, inexpensive, requires minimal maintenance, and is failsafe.

SUMMARY OF THE INVENTION

In accordance with the present invention, semi-submersible floating decanters are presented as well as methods of using same.

A first aspect of the invention is a semi-submersible floating decanter that is movable between a non-decant position and a decant position. The semi-submersible floating decanters of the present invention include a float forming an internal cavity, the float having a center annulus, a weir having an inlet opening, the weir being position within the center annulus and fixedly connected to the float forming a passage between the float and the weir, a discharge conduit is connected to the weir for discharging supernatant liquid therefore, and a depth adjusting mechanism for moving the decanter within a liquid between a non-decant position wherein the inlet opening is above the surface of the liquid and a decant position wherein the inlet opening is positioned within the supernatant to allow the supernatant to be withdrawn, the depth adjusting mechanism including a pumping mechanism for moving a fluid relative to the internal cavity.

The float may be constructed of a material so as to be neutrally, positively, or negatively buoyant in the liquid to be treated depending on the depth adjustment mechanism utilized. The float may have a sloping, conical bottom to enhance gas bubbles and entrained solids to move away from the passage between the float and the weir, thus helping avoid solids form the scum layer and/or sludge blanket leaving with supernatant liquid. The weir is fixedly connected to the float within the center annulus, and may have a conical lower surface which works with the conical bottom of the float, as further described herein. The weir may be a solids excluding weir.

The fluid used in the depth adjusting mechanism may be a gas or a liquid. The gas may be selected from the group consisting of air, inert gases, and mixtures thereof, although it is preferred to use a relatively inexpensive and readily available gas. The liquid may be any liquid suitable for the process including, but not limited to, influent liquid or water.

The pumping mechanism may include various mechanisms for charging the internal cavity of the float with a fluid and/or discharging fluid from the internal cavity. The pumping mechanism is broadly defined to include various types of pumps and discharge valves for transferring a fluid to and from the internal cavity of the float.

The pumping mechanism may include a single pump for controllably injecting a fluid into the internal cavity and for discharging a fluid from the internal cavity. The pumping mechanism may include multiple pumps for discharging and discharging the fluid from the internal cavity. The pumping mechanism may include a pump for discharging fluid into the internal cavity and a valve for discharging fluid from the internal cavity.

The semi-submersible floating canters of the present invention may further include additional operational control equipment and failsafe mechanisms. For example, apparatus of the present invention may include a high level and a low level switch in connection with pumping mechanism for maintaining the decanter in a selected position. The semi-submersible floating decanters of the invention may include a high level switch in connection with the depth adjusting mechanism and pumping mechanism to ensure that the float is never completely submerged in mixed liquor. It may further be desired to include a relief valve that works in conjunction with a pumping mechanism to controllably release fluid from the internal cavity. It may also be desired to include a relief valve as a failsafe device to release fluid form the internal cavity if fluid pressure within the internal cavity exceeds those of the float.

Another aspect of the invention are methods of using the inventive semi-submersible floating decanters of the invention in decanting supernatant liquids.

Further aspects and advantages of the invention will become apparent by reviewing the description of embodiments that follows.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
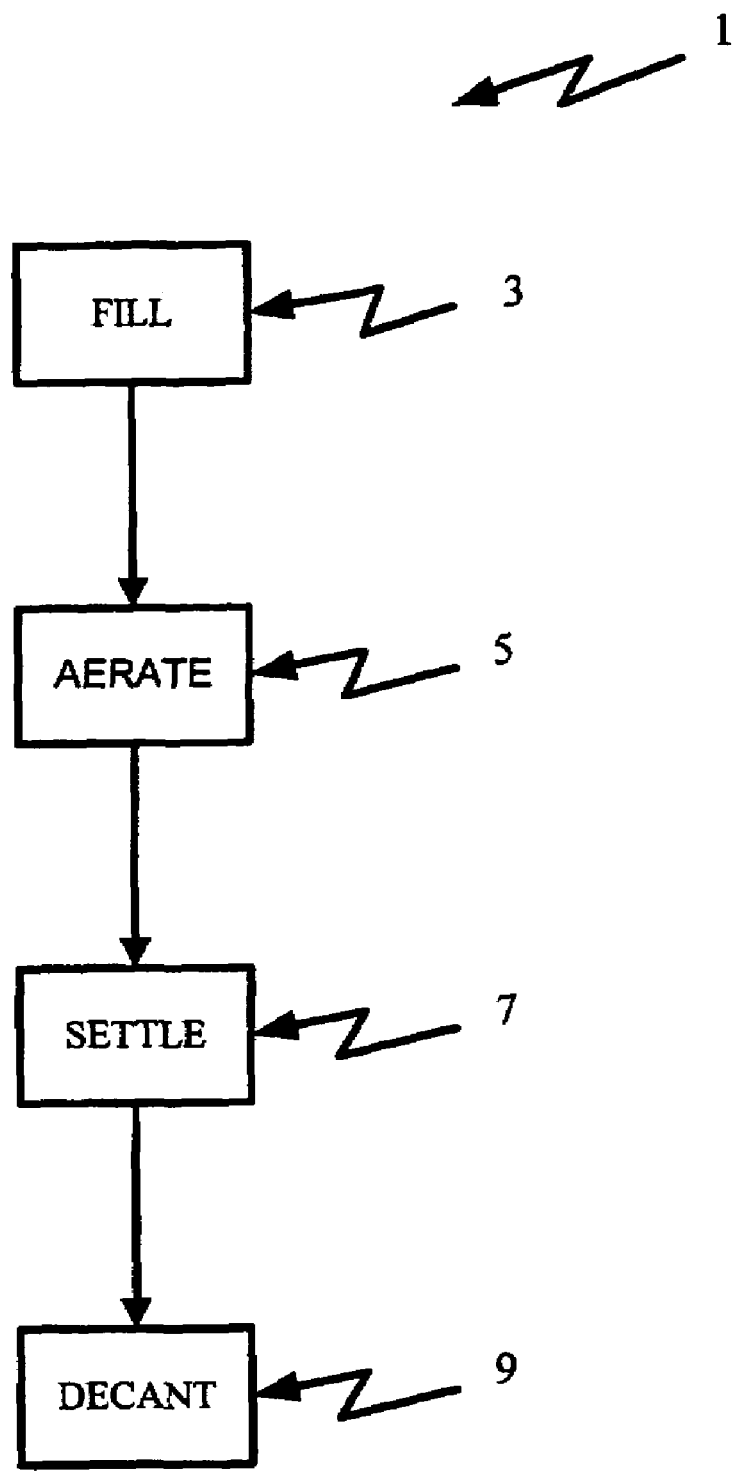
FIG. 1 is a block diagram of a sequencing batch reactor process.

Referring now the drawing figures, wherein depicted elements are not necessarily illustrated to scale and wherein like or similar elements are designated by the same references numeral through the several views.

FIG. 1 is a block diagram of a Sequencing Batch Reactor (SBR) process 1 of the invention. For exemplary purposes, SBR process 1 is described in relation to wastewater treatment. SBR process 1 may include more or fewer steps. The process 1 of operating an SBR includes the basic steps of: fill 3, aerate 5, settle 7, and decant 9.

In fill step 3 an influent wastewater is added to a reactor 46 (FIGS. 2-5). Fill step 3 may be accomplished in several variations including static fill, mixed fill, and aerated fill. Each step of SBR process 1 is determined by the influent being treated wherein additional steps or overlapping of steps may occur.

Aerate step 5 represents the step of aerating the contents of the reactor to begin aerobic reactions and achieve nitrification. Aerate step 5, sometimes referred to as a react step continues until the desired biodegradation of the biological oxygen demand (BOD) is achieved.

In settle step 7 aeration is discontinued and solids separation takes place leaving a substantially clear supernatant disposed above a sludge blanket and below a scum layer. During this step no liquids should enter or leave the reactor to avoid turbulence in the supernatant.

In decant step 9 the supernatant is removed by a floating decanter of the invention. The removal of the supernatant must be performed without disturbing the solids in the scum layer or the sludge blanket.

Figure 2:
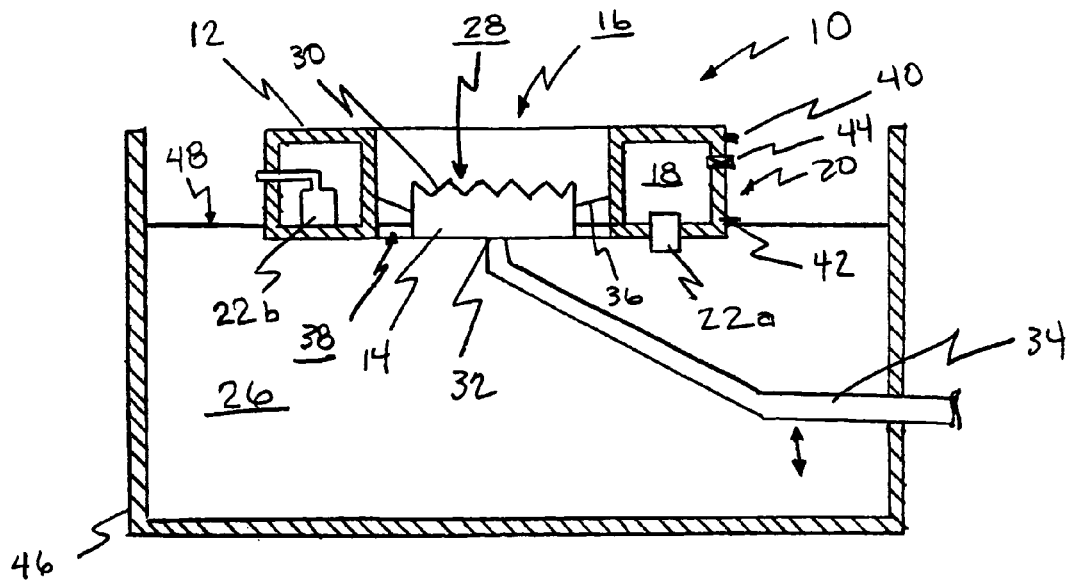
FIG. 2 is a partial cross-sectional, side view of a first semi-submersible floating decanter of the present invention in a non-decant step of a sequencing batch reactor process.
Figure 3:
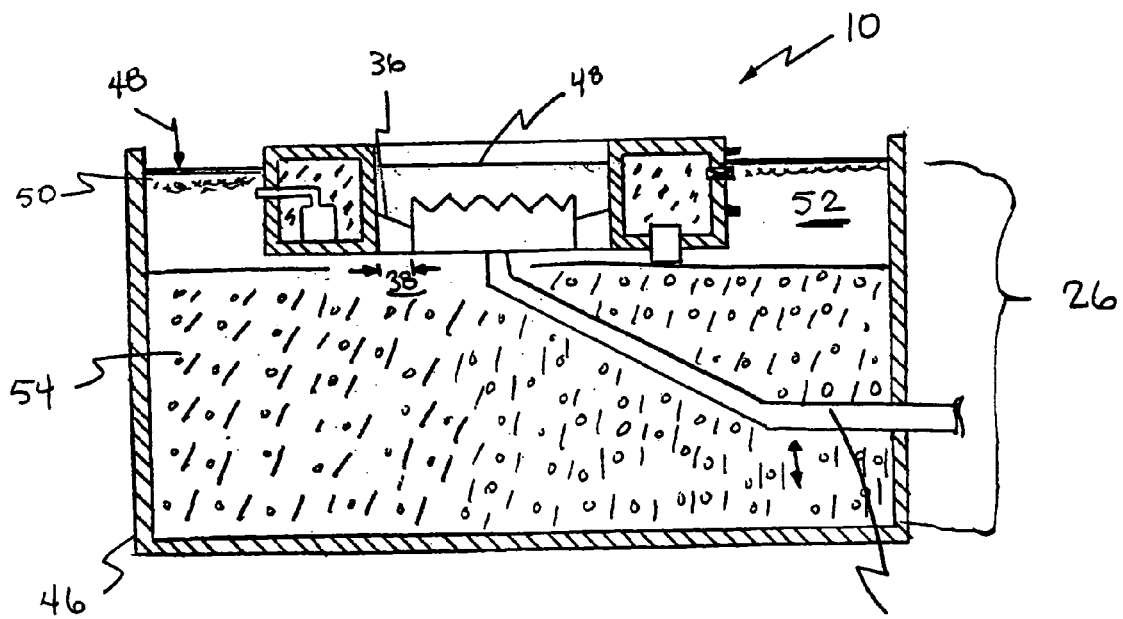
FIG. 3 is a partial cross-sectional, side view of the semi-submersible floating decanter of FIG. 2 in a decant step of a sequencing batch reactor process.

With reference to FIGS. 2 and 3, there is illustrated a semi-submersible floating decanter of the present invention, generally designated by the numeral 10. FIG. 2 illustrates an SBR in a non-decant step. FIG. 3 illustrates an SBR in a decant step. Semi-submersible floating decanter 10 includes a float 12 and a weir 14.

Float 12 may be constructed from various materials to endure the conditions to which it is subjected, including, but not limited to, chemical and atmospheric conditions. Float 12 may be constructed of a material so as to be positively buoyant, neutrally buoyant, or negatively buoyant in relation to liquid 26 depending on other elements of the present invention that will become more apparent hereafter. Float 12 is desirably a torroidal shape and more specifically a torus having a center annulus 16. Float 12 further includes an internal cavity defined by float 12. However, it should be recognized that other variations are within the invention, for example, internal cavity 18 may be connectively segmented pursuant to various embodiments of the semi-submersible floating decanters of the present invention.

Weir 14 is a circular element having an inlet opening 28 defined by a top rim 30. In a preferred embodiment weir 14 is a solids excluding weir. Weir 14 further includes a discharge orifice 32 connected to a discharged conduit 34. Discharge conduit 34 is moveable to an extent to allow float 12 and weir 14 to move at least in the vertical plane between a non-decant position illustrated in FIG. 2 and a decant position as illustrated in FIG. 3.

Weir 14 is disposed within center annulus 16 of float 12 and fixedly connected thereto so as to move with float 12. Weir 14 is connected to float 12 by struts 36. Weir 14 is fixedly connected to float 12 within center annulus 16 to form a circumferential passage 38 between float 12 and weir 14. As shown in FIGS. 2 and 3 float 12 ad weir 14 are spaced apart so that passage 38 is approximately three inches wide.

Semi-submersible floating decanter 10 further preferably includes a depth adjustment mechanism 20 for positioning semi-submersible floating decanter 10 within liquid 26. Depth adjustment mechanism 20 includes an internal cavity 18 formed within float 12 and a pumping mechanism 22 for introducing a fluid into the internal cavity when desired. As illustrated in FIGS. 2 and 3 the pumping mechanism preferably includes an inlet pump 22a and an outlet pump 22b. Inlet pump 22a is positioned in fluid connection between internal cavity 18 and exterior of float 12 for introducing fluid into internal cavity 18 causing semi-submersible float decanter 10 to descend into liquid 26. Outlet pump 22b is in fluid connection between internal cavity 18 and external of float 12 for removal of fluid from internal cavity 18 causing semi-submersible float decanter 10 to ascend in liquid 26.

As illustrated in the embodiment of FIGS. 2 and 3 a pair of pumps 22a and 22b are utilized to introduce liquid 26 into and discharge liquid 26 from internal cavity 18. However, it should be realized that a single pump 22 may be utilized to introduce a fluid into internal cavity 18 and/or remove fluid from internal cavity 18.

It should be further recognized that a fluid other than liquid 26 may be utilized. For example, in another embodiment of the semi-submersible floating decanter of the present invention 10 the fluid is a gas such as air, which is injected into internal cavity 18 by a compressor to raise semi-submersible floating decanter 10 in liquid 26. In this embodiment, the gas would be released from internal cavity 18 via a relief valve 44 to lower semi-submersible floating decanter 10 in liquid 26.

Depth adjustment mechanism 20 may further include additional control or failsafe mechanisms. For example, depth adjustment mechanism 20 may include a high water level switch 40 and a low level water switch 42 in connection with pump 22 to maintain semi-submersible float decanter 10 positioned within a desired depth range. Depth adjustment mechanism 20 may further include a relief valve 44 for release of fluid from internal cavity 18. Relief valve 44 may be a high-pressure relief valve and/or a manually operated valve and/or a controlled valve.

FIG. 2 is a partial cross-sectional, side view of semi-submersible floating decanter 10 of the present invention in a non-decant step of a SBR process. A reactor 46 is filled with an influent liquid 26 to be treated. Reactor 46 may be an enclosed or open top container. Reactor 46 may be constructed of various materials depending on the influent to be treated and economic concerns. As used herein the term "reactor" includes an SBR, a pond, a lagoon, a basin, or some other vessel.

During the non-decant steps of an SBR process liquid 26 is a suspended solids filled fluid referred to as a liquor. In brief, the non-decant steps of SBR processes are to fill reactor 46 with an influent liquid 26, fill step 3, aerate liquid 26 and allow reaction, aerate step 5, and allow the suspended solids to settle, step 7, to form a supernatant 52 above the settled or settling material 54. During these non-decant steps it is desired to maintain the inlet opening 28 of inlet weir 14 above the surface 48 of liquid 26 preventing the entrance of particulate solids into inlet opening 28 and discharging through discharge conduit 34. Thus, the semi-submersible floating decanter 10 is buoyantly supported in liquid 26 in a non-decant position wherein at least inlet opening 28 or weir 14 is maintained above surface 48 of liquid 26.

Inlet opening 28 is positioned above surface 48 in the non-decant phases by utilizing a depth adjustment mechanism 20. In a preferred embodiment, semi-submersible floating decanter 10 is positively or neutrally buoyant in liquid 26 and therefore inlet opening 28 is maintained in a static state above surface 48. If semi-submersible floating decanter 10 is negatively buoyant it may be desired to inject a fluid lighter than liquid 26 such as air into internal cavity 18 to maintain inlet opening 28 above surface 48.

Semi-submersible floating decanter 10 of the present invention ideally adjusts with the variations in the level of surface 48 to maintain inlet opening 28 above surface 48 throughout the non-decant steps: fill 3, aerate 5, settle 7 of process 1 (FIG. 1). Semi-submersible floating decanters 10 of the invention do not have the high moment of inertia of a decanter having a mounted linear actuator. Therefore, semi-submersible floating decanters of the invention permit conducting steps of SBR process 1 with minimal monitoring of or structural support of decanter 10.

FIG. 3 illustrates a partial cross-sectional, side view of the semi-submersible floating decanter 10 of the present invention in the decant step 9 of a SBR process 1. In decant step 9 liquid 26 has separated into three primary zones: a scum layer 50 proximate surface 48; a supernatant layer 52 positioned below scum layer 50; and a sludge blanket 54 positioned below supernatant layer 52. In FIG. 3, semi-submersible floating decanter 10 is positioned in the decant position wherein inlet opening 28 is positioned within supernatant 52 so as to withdraw supernatant 52 from reactor 46 through discharge orifice 32 an discharge conduit 34.

Semi-submersible floating decanter 10 is positioned within supernatant layer 52 through utilization of depth adjustment mechanism 20. As specifically illustrated in FIGS. 2 and 3, pumping mechanism 22 draws a fluid, such as liquid 26, into internal cavity 18 so that semi-submersible floating decanter 10 descends into liquid 26 to a level wherein inlet opening 28 of weir 14 is positioned within supernatant 52. It is desired to maintain inlet opening 28 at a level to prevent solids coming in from either scum layer 50 or sludge blanket 54.

Float 12 protects weir 14 from most turbulence encountered in reactor 14 that may introduce contaminants from scum layer 50 and/or sludge blanket 54 into inlet opening 28. Float 12 further provides a barrier to reduce solids from entering weir 14 during decant step 9. Passage 38 formed between float 12 and weir 14 further reduces entrained solids from entering inlet opening 28.

Figure 4:
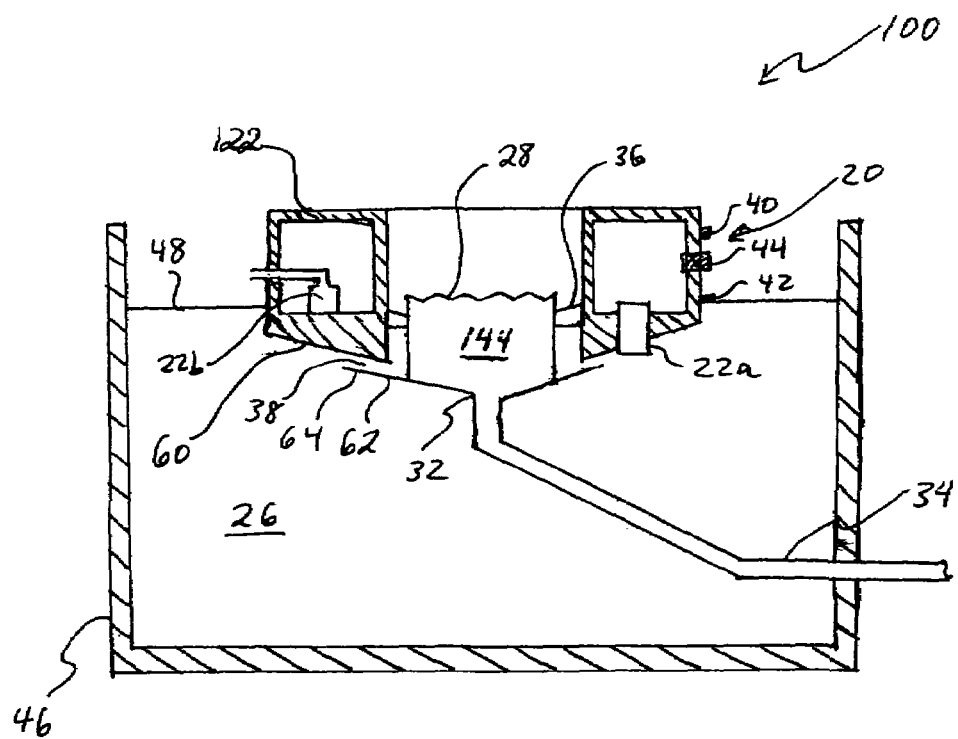
FIG. 4 is a partial cross-sectional, side view of a second semi-submersible floating decanter of the present invention in a non-decant step of a sequencing batch reactor process.
Figure 5:
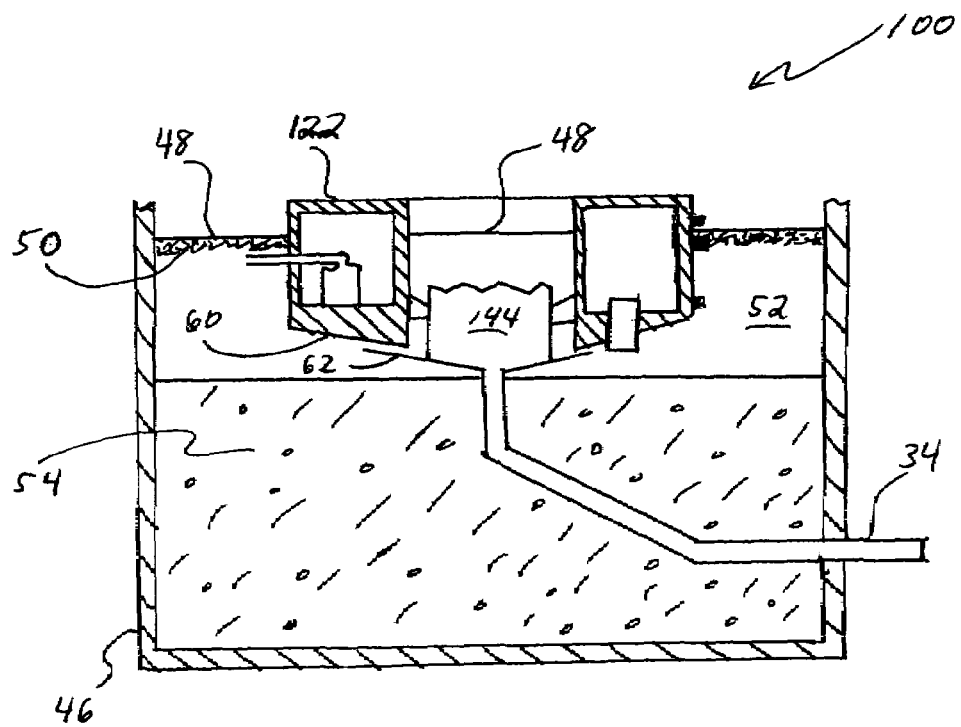
FIG. 5 is a partial cross-sectional, side view of the semi-submersible floating decanter of FIG. 4 in a decant step of a sequencing batch reactor process.

Referring now to FIGS. 4 and 5, there is illustrated a second semi-submersible floating decanter 100 of the invention. This particular decanter (illustrated in FIG. 4 in non-decant position, and in FIG. 5 in decant position), is the same as decanter 10 of FIGS. 2 and 3, except that float 122 has a sloped, conical bottom shape 60, and weir 144 has a conical shape 62, which includes an extension (bubble baffle) 64 to overlap with the conical bottom 60 of float 122. As will be apparent, this arrangement address the issue of rising bubbles during the aerate phase. Bubbles are urged away from annulus opening 38 by the shallow angle baffle 64 attached to the bottom of weir 144. The upward, outward sloping baffle and corresponding float bottom 60 combine to cause bubbles to flow to the outside of float 122. If aeration bubbles are allowed to enter the annulus 38 they will carry solids with foam into weir 144. At start of decant phase, these undesirable solids will be swept out in the effluent—defeating the purpose of the decanter.

The inventive semi-submersible floating decanters are particularly useful in methods of decanting supernatant from a liquor in wastewater treatment facilities, as illustrated in FIG. 1, and these methods of using the inventive decanters are also considered within the invention. Depending on the nature of the wastewater being treated, the fill, aerate, settle, and decant steps will vary in severity and length of time. It is considered within the invention that the fill and aerate steps may overlap, in other words, aeration may begin during filling. Typically, but not always, there may be some remnants of aeration step occurring as the settle phase is beginning, but preferably there is no aeration during settling. During decanting of supernatant, there may be gas bubbles still left over from the aerate step, but for most of the inventive methods, decant will occur only after substantially all of the gas from the aerate step has been added to the wastewater. Preferably, decant step 9 will be a timed step.

Therefore, depth adjustment mechanism 20 may be attached to an automated control system for positioning semi-submersible floating decanter 10 in the decant position for a specific period of time. Upon completion of decant step 9, semi-submersible floating decanter 10 will be raised to a non-decant position for the non-decant steps of an SBR process. As discussed it may be desired to include a high water level switch 40 and a low level water switch 42 to further control the depth positioning of semi-submersible floating decanter 10 within liquid 26.

From the foregoing detailed description of specific embodiments of the invention, it should be apparent that novel and patentable semi-submersible floating decanters and processes of using same have been described. Although specific embodiments of the invention have been described herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the described embodiments without departing from the scope of the appended claims. For example, various materials of construction may be utilized, and variations in the fluid utilized in the depth adjusting mechanism and the pumping means are considered within the invention.

What is claimed is:

1. A semi-submersible floating decanter for decanting supernatant from a reactor, said semi-submersible floating decanter comprising:
    a) a float forming an internal cavity, said float having a center annulus;
    b) a weir having an inlet opening, said weir positioned within said center annulus and fixedly connected to said float to form a passage between said float and said weir;
    c) a discharge conduit in connection with said weir for discharging supernatant therefrom; and
    d) means for adjusting a depth of said semi-submersible floating decanter within a liquid between a non-decant position wherein said inlet opening is above the surface of the liquid and a decant position wherein said inlet opening is positioned within the supernatant to allow the supernatant to be withdrawn, said depth adjusting means including an inlet pump for injecting said fluid into said internal cavity and an outlet pump for discharging said fluid from said internal cavity.

2. The semi-submersible floating decanter of claim 1 wherein said weir is a solids excluding weir.

3. The semi-submersible floating decanter of claim 1 wherein said depth adjusting means further includes a high water level switch in connection with said float and said outlet pump, and a low water level switch in connection with said float and said inlet pump.

4. The semi-submersible floating decanter of claim 1 wherein said depth adjusting means includes a high water level switch in connection with said float and said outlet pump.

5. The semi-submersible floating decanter of claim 2 wherein said depth adjusting means further includes a high water level switch in connection with said float and said outlet pump, and a low water level switch in connection with said float and said inlet pump.

6. The semi-submersible floating decanter of claim 1 wherein said fluid is a liquid.

7. The semi-submersible floating decanter of claim 1 wherein said fluid is a gas.

8. The semi-submersible floating decanter of claim 1 wherein said float has a conical bottom, and said weir has a conical bottom that includes a bubble baffle.

9. A semi-submersible floating decanter for decanting supernatant from a reactor, said semi-submersible floating decanter comprising:
    a) a float forming an internal cavity, said float having a center annulus and a conical bottom;
    b) a solids excluding weir having an inlet opening and a conical bottom that includes a bubble baffle, said weir positioned within said center annulus and fixedly connected to said float to form a passage between said float and said weir;
    c) a discharge conduit in connection with said weir for discharging supernatant therefrom; and
    d) means for adjusting a depth of said semi-submersible floating decanter within a liquid between a non-decant position wherein said inlet opening is above the surface of the liquid and a decant position wherein said inlet opening is positioned within the supernatant to allow the supernatant to be withdrawn, said depth adjusting means including pumping means having a single pump for injecting a fluid into said internal cavity and discharging said fluid from said internal cavity.

10. The semi-submersible floating decanter of claim 9 wherein said depth adjusting means includes a high water level switch in connection with said float and said pumping means.

11. The semi-submersible floating decanter of claim 9 wherein said fluid is a liquid.

12. The semi-submersible floating decanter of claim 9 wherein said fluid is a gas.

13. A semi-submersible floating decanter for decanting supernatant from a reactor, said semi-submersible floating decanter comprising:
    a) a float forming an internal cavity, said float having a center annulus and a conical bottom;
    b) a weir having an inlet opening, a conical bottom, and a bubble baffle, said weir positioned within said center annulus and fixedly connected to said float to form a passage between said float and said weir;
    c) a discharge conduit in connection with said weir for discharging supernatant therefrom; and
    d) means for adjusting a depth of said semi-submersible floating decanter within a liquid between a non-decant position wherein said inlet opening is above the surface of the liquid and a decant position wherein said inlet opening is positioned within the supernatant to allow the supernatant to be withdrawn, said depth adjusting means including means for pumping a fluid relative to said internal cavity.

* * * * *